Dec. 31, 1968    R. F. LEONARD    3,419,128
CONVEYOR SYSTEM
Filed Oct. 7, 1966

INVENTOR
Roy F. Leonard
BY
ATTORNEYS.

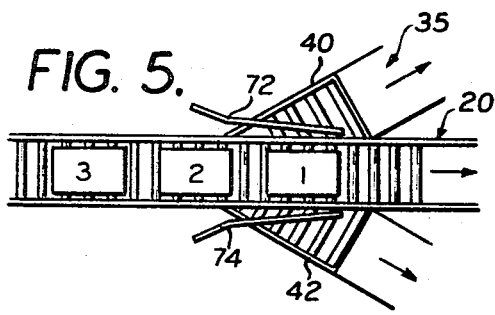
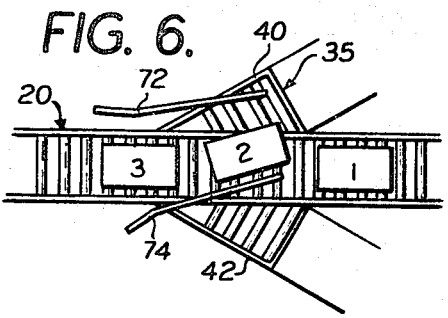
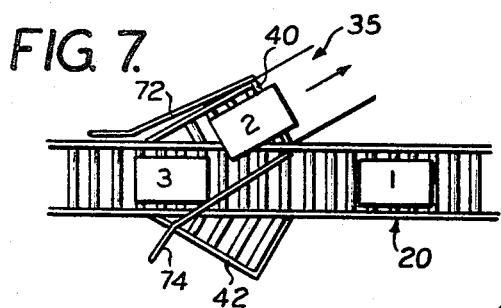
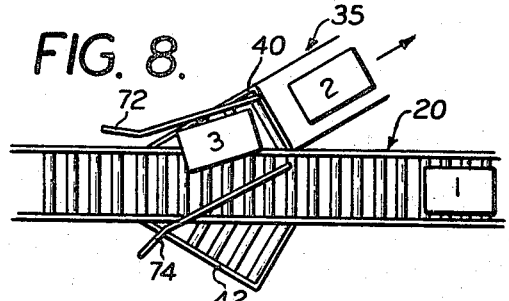
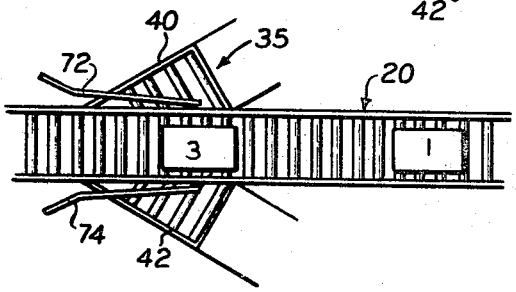
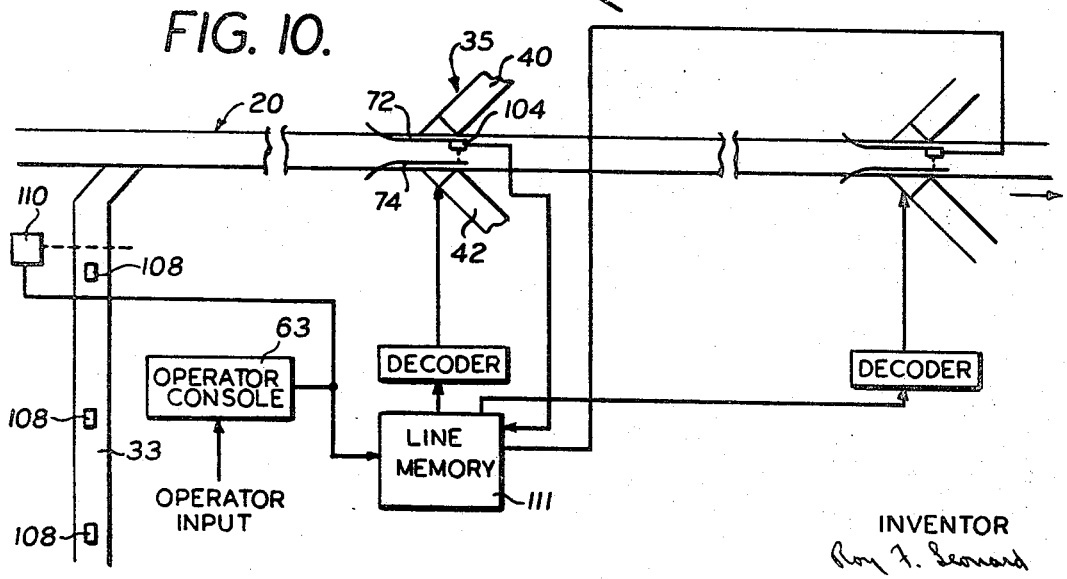

United States Patent Office 3,419,128
Patented Dec. 31, 1968

3,419,128
CONVEYOR SYSTEM
Roy F. Leonard, 521 Roosevelt Ave.,
River Vale, N.J. 07675
Filed Oct. 7, 1966, Ser. No. 585,049
9 Claims. (Cl. 198—31)

ABSTRACT OF THE DISCLOSURE

This sorting apparatus includes an assembly having deflectors that can be located on opposite sides of a basic conveyor for deflecting articles from the conveyor. The deflector assembly is not part of the basic conveyor and it can be located at any selected location along the basic conveyor where a sorting station is desired. The deflectors are connected together under the conveyor for operation in unison and they can be used in combination with branch conveyors located on one or both sides of the basic conveyor at the sorting station.

Background and summary of the invention

This invention relates to improved apparatus and method for removing selected articles from a moving conveyor at preselected removal stations or switches of a plurality of stations along the length of the conveyor.

The invention is an improvement on the apparatus disclosed in my co-pending application Ser. No. 493,398 filed Oct. 6, 1965 now U.S. Patent No. 3,384,237.

It is an object of the invention to provide an improved sorting conveyor system having sorting stations that can be installed at any location along a basic conveyor by being mounted alongside of or around the basic transport medium in contrast to systems where the basic conveyor has to be interrupted to make space for installations of a sort station. This invention can be installed between sections of a basic conveyor or along the run of a basic conveyor which has no interruption for the sort station, the method of installation being optional.

Another object is to provide an improved sorting conveyor system with automatic control means requiring only one signal input for each article; this signal being to indicate destination. No length signal is required in the preferred embodiment of this invention.

The invention provides an improved sorting station with diverting means to physically remove an article to be sorted from the through path to side discharge means, such as another conveyor or chute, and to divert articles selectively to either side, and under control of a memory system into which signals are coded by a console operator or by one of a number of such operators at different consoles.

Another object is to provide a sorting conveyor with means for auditing the operation to detect unauthorized removal of an article from a conveyor between stations or the addition of an article without coding it into the memory systems at one of the consoles.

Still another object is to provide an improved combination of control apparatus for a sorting conveyor system. It is one object of the electrical control system of this invention to provide means whereby sorting decisions can be made by one or more operators, or by means of automatic inspection devices, at the start of a conveoyr system such that the articles or packages entering the conveyor system will be automatically dispatched and physically sorted at one or more stations further down the conveyor.

It is another object to provide an electrical control system to supervise the conveyor system and auditing of the package content of the system. Toward these ends, the electrical control system has the capability to perform the following functions:

A. Monitors sorting stations to sense full line conditions. In the event a particular sorting station or spur is filled to capacity, packages intended for this station will be re-routed either to a station specially designed for this purpose, or recirculated to the start of the conveyor system. At this point they automatically re-enter into the conveyor system. This procedure is repeated until the filled sorting station has room available for the recirculated packages.

B. Provides for automatic or semi-automatic auditing of the number of articles on the conveyor in total or between two specific points on the conveyor.

C. Provides a program for periodically checking accuracy of routing.

The electrical control system is completely asynchronous; that is, its operation does not rely upon establishing and maintaining a fixed relative position between the package and the conveyor belt. The control system is capable of handling packages entered at irregular intervals and where the spacing between packages may change as the result of shifting during their movement along the conveyor. The invention is suitable for different types of conveyor including belt conveyors and roller conveyors.

Other objects, features and advantages of the invention will appear or be pointed out as the description proceeds.

Brief description of the drawing

In the drawing, forming a part hereof, in which like reference characters indicate corresponding parts in all the views;

FIGURES 5-9 are diagrammatic top plan views, on a reduced scale, showing the operation of the sorting station illustrated in FIGURES 2-4;

FIGURE 10 is a diagrammatic view of a portion of the conveyor system as shown in FIGURE 1 with part of the control apparatus shown diagrammatically;

Description of preferred embodiment

Figure 1:
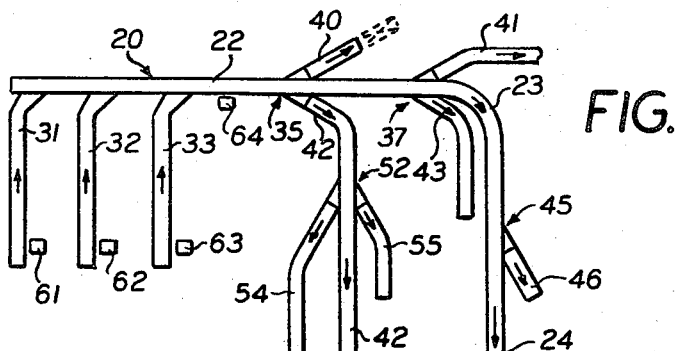
FIGURE 1 is a diagammatic, top plan view of a conveyor system made in accordance with this invention.

FIGURE 1 shows a basic or main conveyor 20 which extends along a straight run 22, around a curve 23, along a straight run 24, around another curve 25 and along another straight run 26 which is indicated in FIGURE 1 as on a slope which changes the elevation of the main conveyor. The conveyor may extend along other runs and around other curves and return to the straight run 22. In the illustrated construction, there are three supply spurs 31, 32 and 33 which consist of short conveyors that discharge articles onto the main conveyor 20 along a portion of the straight run 22. There is a first sorting station 35 and a second sorting station 37 located along the straight run 22. Both of these sorting stations 35 and 37 sort both the right and left. There are conveyors 40 and 41 for carrying articles away from the sorting stations 35 and 37 on the left of these sorting stations and there are conveyors 42 and 43 for carrying articles away from the sorting stations 35 and 37, respectively, on the right of these sorting stations.

Beyond the curve 23 there is a sorting station 45 which sorts in one direction only and to a branch conveyor 46. Beyond the bend 25 and along the run 26 there are other branch conveyors 48 and 49 which carry articles away from a sorting station 50 to the right and left, respectively, of the sorting station 50.

Any of the branch conveyors may themselves have branch conveyors and in FIGURE 1 the branch conveyor 42 is shown with an inner net of stations including a sorting station 52 which delivers articles to branch conveyors 54 and 55 at opposite sides of the sorting station. Articles may also be passed straight through the sorting station 55 along the main portion of the branch conveyor 42 and there may be other sorting stations further along this branch conveyor 42.

The conveyors are illustrated diagrammatically and it should be understood that the term "conveyor" is used in a broad sense to indicate any type of conveyor along which articles or packages may move and that the conveyors, particularly the branch conveyors, may be chutes or run-out tables or spurs for accumulating articles or packages that come from the sorting station and that are advanced along the chute or other form of conveyor by gravity or by pressure of another article or package delivered from the sorting station.

The control system for the sorting stations has destination signals for the respective articles coded into a memory from consoles 61, 62, 63 and 64. In the operation of the system, the consoles 61, 62, and 63 can be used for coding in the destination signals for articles supplied to the main conveyor 20 from the supply spurs 31, 32 and 33 respectively. The console station 64 can be used for coding in signals for all of the packages if the consoles 61, 62 and 63 are not used. If these consoles 61, 62 and 63 are used, then the console 64 is used only for packages which come along the main conveyor 20 from beyond the supply spurs 31, 32 and 33. It should be understood that when the consoles 61, 62 and 63 are used, some interlock is necessary so that the signals coded into the memory are in the sequence in which the articles from the various supply spurs are admitted to and located sequentially along the main conveyor 20. This will be explained in more detail in connection with other figures.

Figure 2:
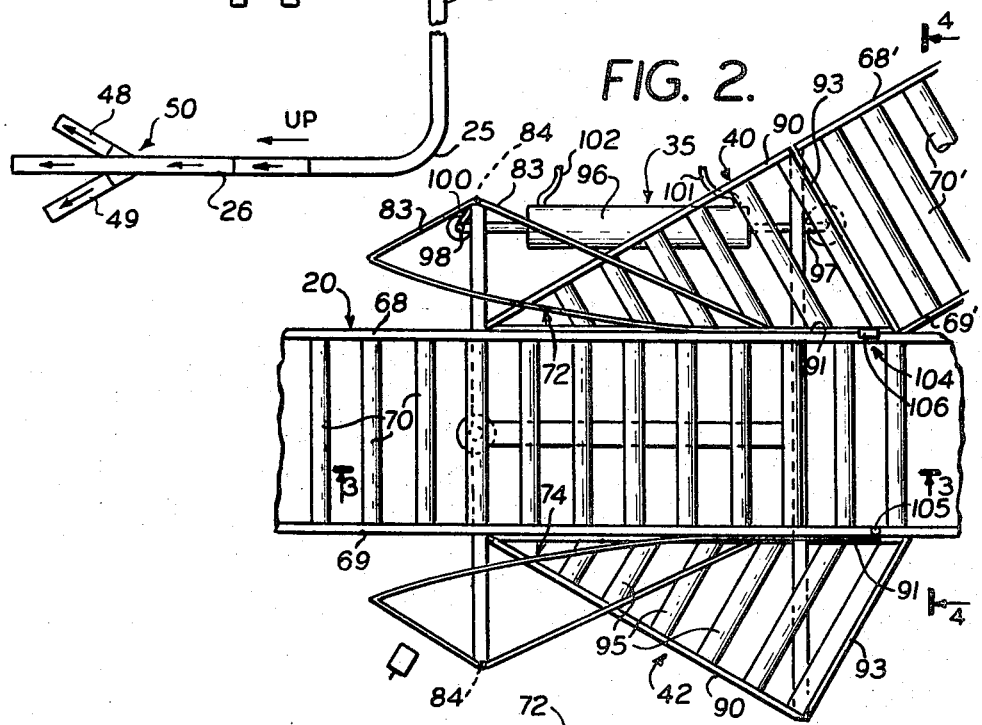
FIGURE 2 is a greatly enlarged, top plan view of one of the sorting stations of the conveyor system shown in FIGURE 1.

FIGURE 2 shows the sorting station 35 with the basic or main conveyor 20 extending as a continuous unit through the sorting station. This main conveyor 20 includes stationary side frames 68 and 69 and rollers 70 extending between the side frames 68 and 69 and supported on bearings for rotation in the manner conventional with conveyors of this kind. There are two deflectors 72 and 74. Each of these deflectors is an arm of frame-like construction in order to give it a substantial height for use with packages of substantial height and each deflector has the frame-like structure made up of an upper frame element 76, a lower frame element 78 and end elements 79 and 80 joining the frame elements 76 and 78 at their upstream and downstream ends. The frame-like structure of each of the deflectors 72 and 74 has back bracing 83 joining the deflectors to a lower transverse frame 86 to which the deflectors are both rigidly connected in the illustrated embodiment of the invention.

The frame 86 extends under the basic or main conveyor 20 and it has bearings 87 by which it is supported on a fixed center support 89, preferably extending upward from the bore or other face. Thus the deflectors 72 and 74 are, in effect, of one-piece construction with the transverse frame and with each other so that they swing in unison to either side of the mid-position in which they are shown in FIGURE 2.

Figure 3:
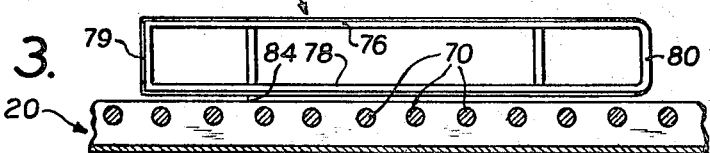
FIGURE 3 is a vertical sectional view of the sorting station shown in FIGURE 2, the section being taken on the line 3—3 of FIGURE 4.
Figure 4:
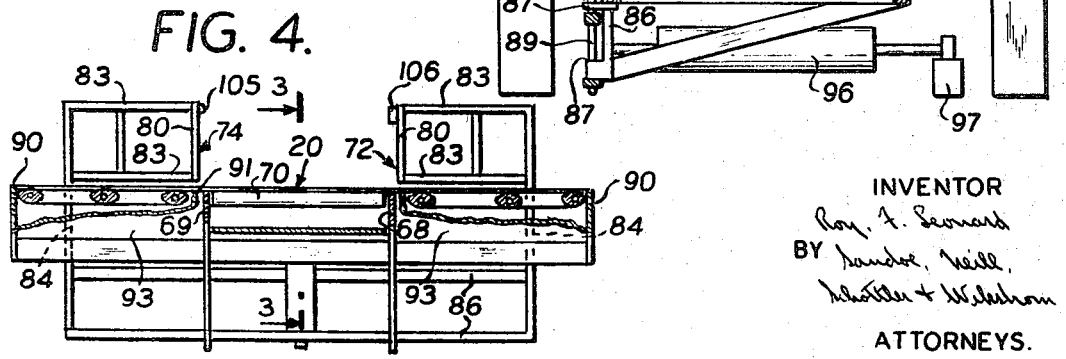
FIGURE 4 is a sectional view taken on the line 4—4 of FIGURE 2.
Figure 11:
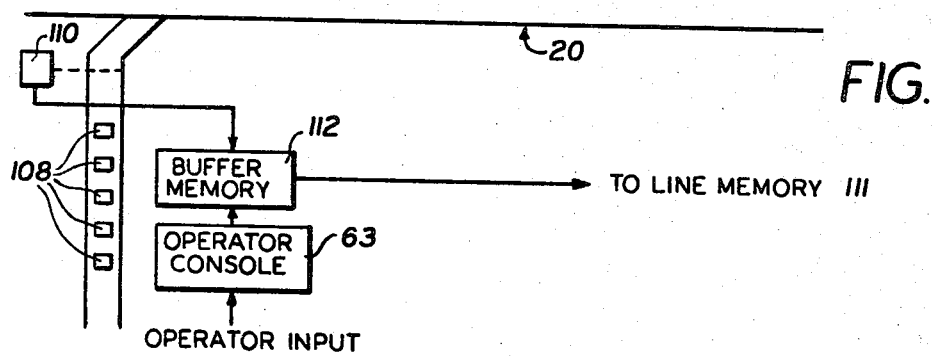
FIGURE 11 is a diagrammatic view showing the changes from the control of FIGURE 10 which are necessary when the system is equipped to accumulate packages on a supply spur.

In this illustrated construction, the deflectors 72 and 74 together with their connections and supporting means are independent of the basic or main conveyor and can, therefore, be located anywhere along the main conveyor 20 without making any interruptions in the main conveyor for installation of a sorting station. The connection between the deflectors 72 and 74 extends under the conveyor rollers 70 in FIGURES 2–4, but this is merely representative of a transverse connection between the detectors extending across the main conveyor out of the path of the articles which travel along the main conveyor; and the connection could be above the rollers 70 if it were sufficiently high to clear the articles which travel along the conveyor 20.

The sorting station 35 also includes branch conveyors 40 and 41. In the illustrated construction, each of these branch conveyors has fixed side frames 90 and 91 connected together by a cross-piece 93 to form a triangular frame; and between these side frames 90 and 91, which are connected to one another at their upstream ends, there are conveyor rollers 95, the rollers becoming progressively longer as the branch conveyor becomes wider as it extends away from the main conveyor 20. Beyond the frame element 93, each of the frame conveyors 40 and 41 has side frames 68' and 69' between which there are conveyor rollers 75 similar to the main or basic conveyor 20. It will be understood that the rollers 70 and 70' of the main and branch conveyors, respectively, and the rollers 95 of the branch conveyors, may be power driven in accordance with conventional practice, or may be idler rollers which are rotated as articles move along the conveyor by gravity or under the influence of other propulsion.

The deflectors 72 and 74 and their connected frame structures including the lower transverse frame 86 swing angularly about the fulcrum axis of the center bearing 89 in response to power supplied to a motor 96 which is connected at 97 to a fixed part of the sorting station frame, and at 98 to the connection 99 on a crank 100 extending from a part of the frame structure of which the deflectors 72 and 74, and the transverse frame 86 are parts. This motor 96 is preferably a cylinder and piston motor and is double acting. When working fluid is supplied to one end of the motor the deflectors 92 and 94 swing clockwise and when working fluid is supplied to the other side of the motor 96, the deflectors 72 and 74 swing counterclockwise about the axis of the fulcrum bearing 89.

FIGURES 5–9 show the operation of the deflectors 72 and 74 with successive packages numbered 1, 2 and 3 passing along the main conveyor 20. The deflectors 72 and 74 extend generally parallel to the sides of the main conveyor 20 and preferably at locations just beyond the sides of the conveyor 20, as shown in FIGURES 5–9. If desired, for small articles, the deflector arms 72 and 74 may be located so that they are above and slightly inward beyond the ends of the rollers 70 of the main conveyor 20. In any event, the upstream ends of the deflectors 72 and 74 may be located so that they are above and slightly inward beyond the ends of the rollers 70 of the main conveyor 20. In any event, the upstream ends of the deflectors 72 and 74 are preferably diverging from one another to locations at substantially far out from the sides of the conveyor 20 so that no matter which way the deflectors 72 and 74 swing, neither of them swings at its upstream end, into the path of the articles moving along the main conveyor.

FIGURE 5 shows the deflectors 72 and 74 in their middle position and shows the first package 1 between the deflectors 72 and 74 near their downstream end, and the next package 2 between the upstream ends of the deflectors 72 and 74.

The destination of the package 1 is straight through insofar as the sorting station 35 is concerned and so both of these deflectors 72 and 74 remain in their mid positions; but the destination for the package 2 is the branch conveyor 40. As soon as the package 1 has cleared the ends of the deflectors 72 and 74, the deflectors swing to the left as shown in FIGURE 6 and deflect the package 2 toward the left so as to physically displace it from the main conveyor 20 and onto the adjacent branch conveyor 40. The package 3 has entered the space between the deflectors 72 and 74 and is following close behind the package 2.

FIGURE 7 shows the deflectors 72 and 74 in their fully deflected position at the left and the package 2 reflected to travel along the branch conveyor 40. The package 3 has also been deflected by the deflector 74 in the direction of the branch conveyor 40.

FIGURE 8 shows the deflectors 72 and 74 moving back toward their mid position. The destination for package 3 is not the conveyor 40 and the deflectors 72 and 74 move back, as soon as the package 2 has cleared the ends of the deflectors, so as to prevent the package 3 from following the package 2 down the branch conveyor 40. The speed of operation of the deflectors 72 and 74 is fast enough, in proportion to the speed at which packages move along the main conveyor 20, so that even though the package 3 is following close behind the package 2, the deflectors 72 and 74 can move all the way from their left hand to their right hand position if necessary to deflect the package 3 to a destination along the branch conveyor 41.

FIGURE 9 shows the package 3 being guided along the main conveyor 20. The destination for the package 3 was not the branch conveyor 41 but some other location beyond the sorting station 35 so the deflectors 72 and 74 return to their mid position and cause the package 3 to follow package 1 along the main conveyor 20.

It will be understood that the motor which swings the deflectors 72 and 74 between their different positions may be hydraulically actuated or it may be operated by compressed gas; or it may be a solenoid or other electrically actuated motor; but in any event it is correlated with the motor means for propelling the packages or other articles along the main conveyor, or with the gravity feed of the main conveyor, so that it can shift from one extreme position to the other within the time it takes a package to clear the forward ends of the deflectors 72 and 74 and the time it takes the center of gravity of the next article to reach the ends of the deflectors 72 and 74. It will be understood that even though the next package has its forward end projecting beyond the downstream end of the deflectors 72 and 74 the package is still under the control of the deflectors as long as its center of gravity has not passed beyond the ends of the deflectors.

The control system has articles or package sensing means 104 at each sorting station. In the illustrated construction the article sensing means includes a light 105 on the deflector 74 and a photocell 106 on the deflector 74. When the light beam is interrupted, a circuit is conditioned to be operated when the light to the photocell is re-established by passage of the rearward end of the package beyond the light beam. This package sensor is located near the downstream end of the deflector so as to determine when a package passes beyond the control of the deflector.

The simplest embodiment of the electrical control system is shown in the block diagram of FIGURE 10. Packages 108 to be placed on the main conveyor first pass through the routing station on the supply spur 33. At the routing station, each package is assigned a destination which is entered at the operator console 63 (for an operator controlled system). The console 63 converts this destination to a digital number for use by a memory 111. The package then passes a package sensor 110 which indicates its entrance to the main conveyor line. At this time, the coded destination is transferred to the line memory 111 and the console 63 is conditioned to accept destination information relating to the next package.

In this arrangement, the operator can enter the destination of the next package only after the preceding package has passed package sensor 110. If it is required that more than one package at a time be present on the spur supply line 33 between the operator and the sensor 110, or if it is required that packages 108 be permitted to accumulate at the supply spur 33 before transfering to the main conveyor 20, then an additional buffer memory 112 is required as shown in FIGURE 2. In this case, the coded destination of each package, accumulated on the spur supply conveyor 33 ahead of the package sensor 110, is temporarily stored in a buffer memory 112. Then, as these packages 111 are released to the main conveyor, the information is transferred in correct sequence from the buffer memory 112 to the line memory 111.

Figure 12:
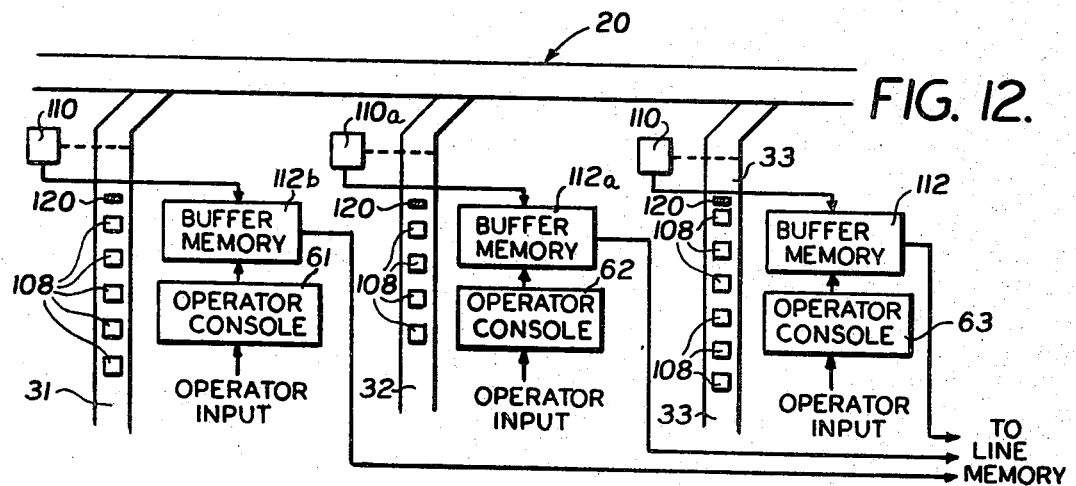
FIGURE 12 is a view similar to FIGURE 11 but showing the construction of the control system for accumulating packages on all of the supply or input spurs of the system shown in FIGURE 1.

Utilizing similar buffer memories 112a and 112b, packages 108 can be introduced into the main conveyor line from several supply spurs 31, 32 and 33, each operating independently and simultaneously as shown in FIGURE 12. For each supply spur a corresponding buffer memory temporarily stores the coded destination of the packages which are then permitted to accumulate in a hold area associated with the station at the supply spur. When sufficient packages have accumulated, or in response to a pre-set program or to a manual signal the packages are released onto the main conveyor 20 in a slug.

The size of the slug is a function of the specific application, while the required buffer memory capacity is one coded destination word for each accumulated package. As the packages are released from a particular hold area of each supply spur, their coded destinations are automatically transferred from the associated buffer memory to the main line memory 111 in the same order as the packages physically enter the main conveyor stream. During the time that packages are being released from one routing station, package release from other routing stations is inhibited by interference 120 electrically or mechanically interlocked with one another.

Operation of the system requires that coded destination signals corresponding to each package 108 be entered into the line memory in the same order as the packages themselves physically enter the main conveyor line. This information is then subsequently read out of the memory, again in the same order, as the packages either arrive at or pass (depending upon whether leading or trailing edge logic is used) the various sorting station sensors. The sorting station senses the presence or passing of a package, refers the memory to the address corresponding to this package and interrogates the memory to receive a coded destination signal. This signal is then decoded and applied to correctly position the diverter. The package sensors can be electro-mechanical devices such as switches, or photo-electric devices, or other forms of electronic proximity switches.

Figure 13:
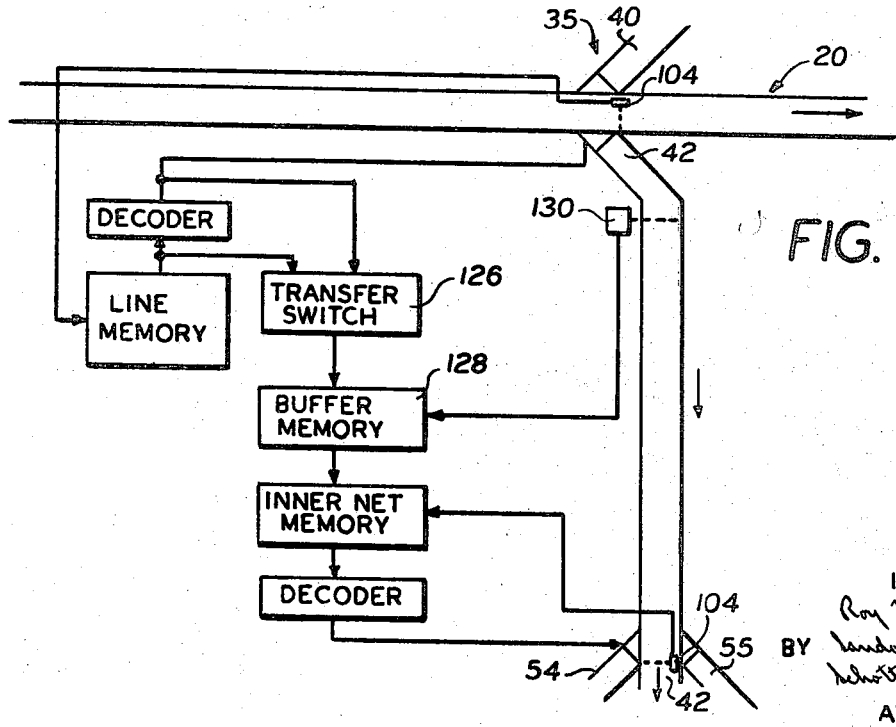
FIGURE 13 is a diagrammatic view of the control system for the inner net of stations shown in the conveyor system of FIGURE 1.
Figure 14:
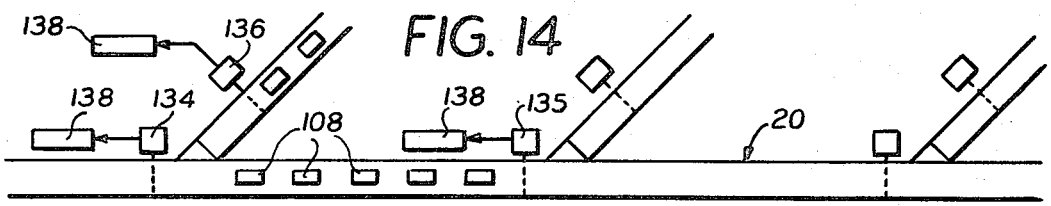
FIGURE 14 is a diagrammatic view showing features of the control system for auditing the operation of the conveyor controls of the system shown in the other figures.

FIGURE 13 shows controls for the branch conveyors 54 and 55, or inner net of the branch 42 from the main conveyor 20. In this case, the coded destination of a package to be transferred to the inner network must also be transferred to the inner network memory. When sorting station 35 receives a signal instructing it to divert the next package to the inner net of branch 42 the coded destination word corresponding to that package is transferred by a switch 126 to a buffer memory 128 for temporary storage. Then, as the package physically enters the inner net as determined by a package sensor 130, the coded word is again transferred this time to the inner network memory. From that point on, operation of the inner network memory (and electrical control system) may be the same as the main conveyor system and memory, or it may be different.

In an embodiment requiring auditing, the package sensors 134, 135 and 136 at selected locations are used to drive electro-mechanical or electronic counters 138, thus providing a figure for the total number of packages entering the portion of the conveyor system immediately beyond the counter operating sensor. In FIGURE 5, the difference between counts taken at the sensors 134 and 135, minus the number of packages diverted between two stations as counted at the sensor 136, gives the instantaneous number of packages 108 on that portion of the conveyor between the sensors 134 and 135.

If, at this time, that portion of the conveyor is stopped and a physical count taken of the packages present, any discrepancies due to unauthorized removal or addition of packages will be detected. If a physical count is undesirable the portion of the line in question can be cleared of packages by inhibiting further packages from entering this section. During the clearing process, a count can be automatically taken of the packages leaving the section, where again, this count should equal the computed value. The length of the conveyor section chosen for this audit is determined by the characteristics of the conveyor installation. Where the length of the section is less than the total length of the conveyor line, a program should be provided to automatically audit successive sections of the line, until the entire line has been audited. The program is periodically repeated.

In an embodiment requiring a further check on accuracy, use can be made of one or more specially prepared test packages. These can be separate and distinct packages from those being sorted, where these packages are intended only for test purposes; or they can be chosen from the packages being processed by being given an identifying mark, tag, nameplate or other distinguishing characteristic. In either case, the test packages must be readily identifiable either by an operator or automatic inspection device. These packages are periodically inserted, via the routing station, into the main conveyor stream. The test program routes the packages to specific destinations (if distinct test packages are used) or read and store the destinations (if in-process packages are used). The specific destinations in question are then monitored to determine that the test packages have arrived within a specific allotted time. Failure of a test package to arrive at its destination indicates a system malfunction. Specifically, cumulative errors in routing caused by the unauthorized addition or removal of packages, are detected.

The memory required for the electrical control system can use magnetic, semi-conductor, or photo-electric devices available for this purpose, or it can comprise relays, delay lines, or other devices, in combinations of devices, as the storage media. The memory can be organized for bulk storage, with either random or sequential access, or it can be organized as a circulating memory or as a shifting register. It is recognized that certain types of storage elements or devices lend themselves more readily to a particular memory format, and that final determination of the type of memory and its organization will be dependent upon the individual requirements of the specific installation, particularly environment, reliability considerations, capacity, size and cost. As such, no one specific memory can be stipulated. However, where very large capacity is unnecessary, and reliability and ease of maintenance are paramount, a shifting register memory lends itself ideally to the application.

Figure 15:
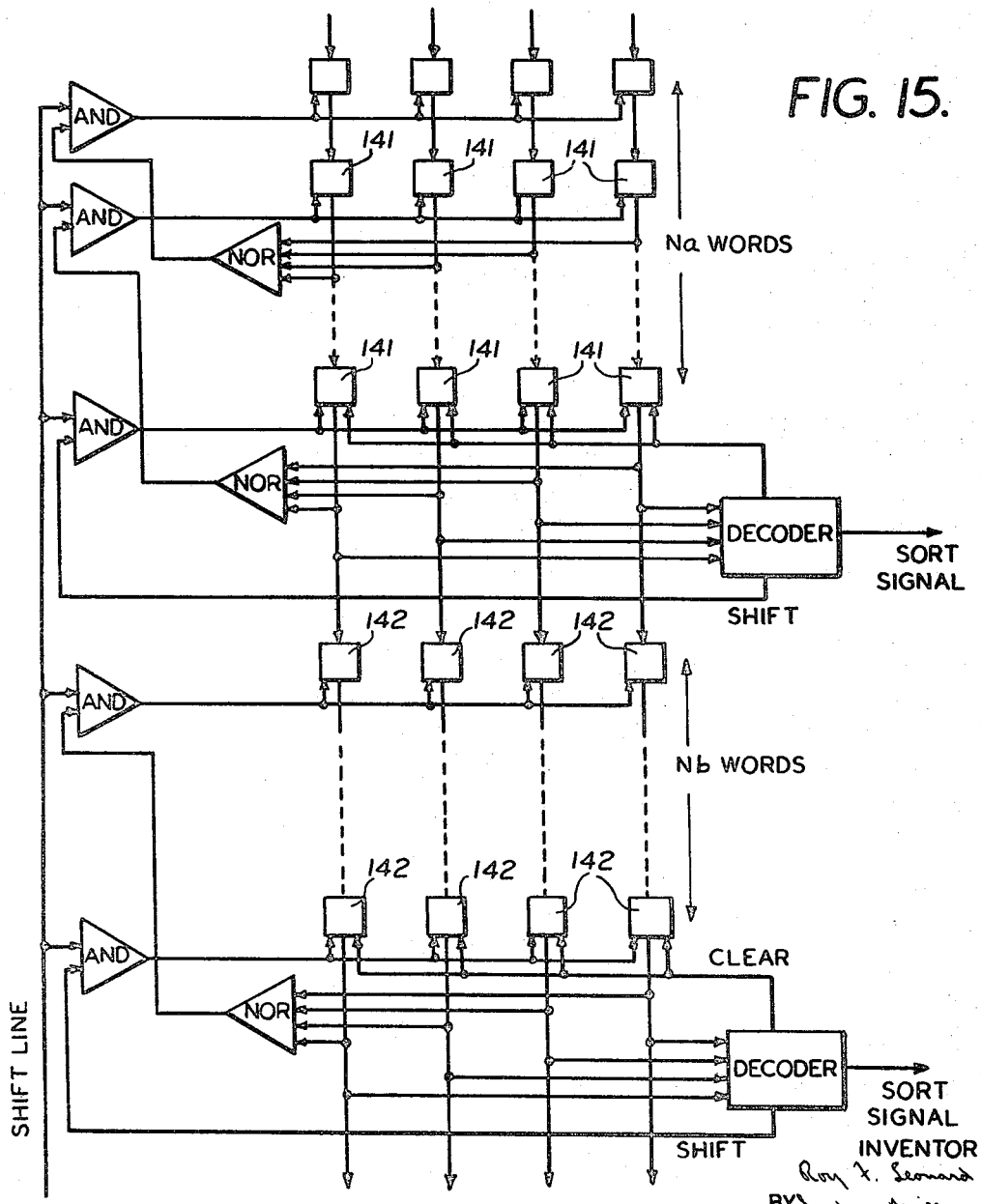
FIGURE 15 is a diagrammatic illustration of one form of memory which can be used with the conveyor system of this invention.

A preferred embodiment, employing a form of shifting register, is shown in block diagram form in FIGURE 15, where each of the boxes represent a semi-conductor bistable multivibrator or flip-flop. The register actually comprises a number of cascaded registers, one for each section of conveyor line existing between any two consecutive sorting stations, or between a routing station or supply spur and a sort station. The number of words, N, required in each of these registers must equal the total maximum number of packages that can exist on the corresponding section of conveyor line at any one time. The number of bits per word in any register is determined by the number of possible destinations or sort commands to be handled by that particular register. That is, if the coded destination signals to be stored in a register represent 15 possible sort commands, then sufficient binary numbers, or bits, must be present to represent these 15 sort commands. The coded destinations are assigned so that the first sort has the highest binary number and the last sort the lowest. In this way, the number of bits required per coded destination word is decreased for those registers further along the line.

As each package enters the conveyor line from the routing station(s) or supply spur, a corresponding coded destination word is entered into the first register. This coded destination word must then be shifted through each stage of the first register to be available at the output by the time the package reaches the first sort station. The shift operation is independent of the number or rate of packages entering the line and is initiated by a pulse generator, or clock, operating at sufficiently high frequency to assure code transfer from the input to the output of the register in a period of time much less than that required for package travel. The shift pulse is applied to a stage in the register only if the following stage is empty. If the following stage is empty, as determined by the NOR gage monitoring its output, the AND gate controlling the shift pulse input to the previous stage is enabled, permitting a shift pulse to enter. In this manner, the first destination word entering the register is shifted stage by stage to the output of the register where it is decoded and applied to the diverter. In a similar manner, the second coded word enters the register and is shifted to a position one step before the output, and so on, filling the register from the bottom up. As the first package reaches the diverter, its presence is sensed and a signal generated to notify the register that the next coded destination word is needed. At this time, the information in the output stage of register will either be cleared, if the package has been removed from the conveyor line at the first sort station, or the information will be transferred to the next register, if the package similarly goes on to the next section of line. With the output stage now emptied, information from the preceding stage will shift down one step to be available at the output.

In a similar fashion, coded destination words transferred to the second register will fill this register from the output stage on up and operation will be identical to that above.

The preferred embodiment of the invention has been illustrated and described, but changes and modifications can be made and some features can be used in different combinations without departing from the invention as defined in the claims.

What is claimed is:

1. Sorting apparatus for connection with a basic conveyor that has fixed frame and movable elements supported by the frame for conveying articles along the conveyor, said apparatus including an assembly different from the basic conveyor and located partly on each side of the basic conveyor, said assembly including a deflector on each side of the basic conveyor movable from a position alongside the path of articles moving along the basic conveyor to a position extending angularly across said basic conveyor for reflecting articles therefrom, the assembly extending transversely across the basic conveyor at a level out of the path of the articles moving along the basic conveyor, and operating means for moving both of the deflectors in unison, the assembly, deflectors, and operating means being independent of the basic conveyor whereby the sorting apparatus can be installed at any selected location along said basic conveyor.

2. The sorting apparatus described in claim 1 characterized by the assembly including a fixed support for the deflectors, and including also a connecting structure joining the deflectors together, and which extends under the movable elements that convey the articles on the basic conveyor.

3. The sorting apparatus described in claim 1 characterized by the sorting apparatus including a branch conveyor located on one side of the basic conveyor adjacent to the deflector on that side of the basic conveyor and in position to receive articles deflected from the basic conveyor by the deflector on the opposite side of the basic conveyor, the branch conveyor being at an acute angle to the basic conveyor and increasing in width as it extends away from the basic conveyor and toward the downstream end of the adjacent deflector.

4. The sorting apparatus described in claim 3 characterized by the movable elements of the basic conveyor being rollers, and the branch conveyor also having rollers of conveying articles, the rollers of the branch conveyor being different rollers from those of the basic conveyor and being progressively longer for a limited distance as the branch conveyor becomes wider and extends away from the basic conveyor.

5. The sorting apparatus described in claim 1 characterized by the fixed support for the deflectors including a pivot bearing located substantially midway between the deflectors, and a connecting structure joining the deflectors together for movement in unison.

6. The sorting apparatus described in claim 5 characterized by branch conveyors extending at an acute angle to the basic conveyor at both sides thereof, one branch conveyor being adjacent to each deflector, both of the branch conveyors being independent of the basic conveyor and in position to receive articles displaced from the basic conveyor by said deflectors, the pivot bearing having an axis substantially in line with the branch conveyors and about which the deflectors have angular movement.

7. The sorting apparatus described in claim 6 characterized by the operating means for the deflectors being a cylinder and piston motor connected at one end with the fixed support that includes said pivot bearing, and connected at the other end with the connecting structure that joins the deflectors together for movement in unison.

8. In a conveyor system, a main line conveyor having movable means that support articles for movement along a path on said conveyor, a sorting station, two deflectors, each of which is on an opposite side of said path from the other, both of the deflectors being angularly movable in unison from a position where both deflectors are alongside the main line conveyor with space between them for the passage of articles along said path and to a position where one of the deflectors extends transversely across the said path for deflecting articles from the main line conveyor and the other deflector extends outward at an acute angle beyond the side of the main line conveyor toward which the articles are deflected, bearing means on which the deflectors have their angular movement, said bearing means being at a location intermediate the upstream and downstream ends of the deflectors so that one end of each deflector swings toward the right while the other swings toward the left, both of the deflectors having upstream ends that diverge from one another and that remains clear of the path of the articles along the main line conveyor for all positions of the deflectors, and characterized by a connecting structure joining the deflectors together, a bearing on the connecting structure midway between the deflectors, the bearing means on which the deflectors have their angular movement being at a fixed location in position to support and operate with said bearing on the connecting structure, branch conveyors on both sides of the main line conveyor at the sorting station, the deflectors being movable, at opposite ends of their angular movement, into positions for deflecting articles from the main line conveyor to the different branch conveyors.

9. The conveyor system described in claim 8 characterized by means for driving the movable means of the main line conveyor to advance the articles along the main line conveyor at a predetermined speed, the deflectors being as long as a plurality of articles with which the conveyor system is intended to be used, mechanism for moving the deflectors back and forth between their different positions, the speed of operation of said mechanism being correlated with that of the means for driving the movable means of the main line conveyor so as to change the positions of the deflectors to a different deflecting position between the time that one article passes beyond the ends of the deflectors and the time that the next article reaches a position with its center of gravity beyond the end of one of the deflectors.

References Cited
UNITED STATES PATENTS 2,219,055 10/1940 Pereslegin _____ 198—188
2,318,221 5/1943 Hayssen _____ 198—33

RICHARD E. AEGERTER, *Primary Examiner.*

U.S. Cl. X.R.

198—81; 214—11